(12) United States Patent
Horng

(10) Patent No.: US 8,696,332 B2
(45) Date of Patent: Apr. 15, 2014

(54) HEAT-DISSIPATING FAN

(75) Inventor: Alex Horng, Kaohsiung (TW)

(73) Assignee: Sunonwealth Electric Machine Industry Co., Ltd, Kaohsiung (TW)

(*) Notice: Subject to any disclaimer, the term of this patent is extended or adjusted under 35 U.S.C. 154(b) by 742 days.

(21) Appl. No.: 12/484,349

(22) Filed: Jun. 15, 2009

(65) Prior Publication Data

US 2010/0316514 A1   Dec. 16, 2010

(51) Int. Cl.
F04B 17/00 (2006.01)

(52) U.S. Cl.
USPC .................................. 417/423.14

(58) Field of Classification Search
USPC ............ 417/423.7, 423.14, 422, 352; 310/71, 310/89, 416; 361/695
See application file for complete search history.

(56) References Cited

U.S. PATENT DOCUMENTS

| | | | |
|---|---|---|---|
| 4,853,568 A * | 8/1989 | Fujiwara | 310/68 C |
| 4,892,863 A * | 1/1990 | Agarwala | 505/166 |
| 5,176,509 A * | 1/1993 | Schmider et al. | 417/423.7 |
| 5,189,327 A * | 2/1993 | Ootsuka et al. | 310/71 |
| 6,179,561 B1 * | 1/2001 | Horng | 415/208.3 |
| 6,544,011 B2 | 4/2003 | Hsieh | |
| 6,608,412 B2 * | 8/2003 | Horng et al. | 310/71 |
| 6,710,486 B1 | 3/2004 | Horng et al. | |
| 7,038,913 B2 | 5/2006 | Lee et al. | |
| 7,066,720 B2 * | 6/2006 | Cheng et al. | 417/423.3 |
| 7,112,910 B2 | 9/2006 | Lopatinksy et al. | |
| 7,134,839 B2 | 11/2006 | Horng et al. | |
| 7,358,631 B2 * | 4/2008 | Morishitahara | 310/71 |
| 7,390,172 B2 * | 6/2008 | Winkler | 417/423.15 |
| 7,532,470 B2 * | 5/2009 | Ariga | 361/695 |
| 7,626,295 B2 | 12/2009 | Yamaguchi | |
| 7,811,069 B2 * | 10/2010 | Fleig | 417/423.14 |
| 8,033,799 B2 * | 10/2011 | Ishikawa | 417/423.14 |
| 2005/0106046 A1 * | 5/2005 | Winkler | 417/423.3 |
| 2005/0180867 A1 * | 8/2005 | Takahashi et al. | 417/423.14 |
| 2007/0099459 A1 * | 5/2007 | Otsuki et al. | 439/144 |
| 2007/0280840 A1 * | 12/2007 | Sugiyama et al. | 417/423.5 |
| 2008/0170935 A1 * | 7/2008 | Nakamura et al. | 415/119 |
| 2009/0016914 A1 * | 1/2009 | Chen et al. | 417/423.7 |

FOREIGN PATENT DOCUMENTS

| | | |
|---|---|---|
| JP | 59025000 U | 2/1984 |
| JP | 3055492 U | 1/1999 |
| JP | 11107996 A | 4/1999 |
| JP | 2000320496 A | 11/2000 |

(Continued)

*Primary Examiner* — Devon Kramer
*Assistant Examiner* — Amene Bayou
(74) *Attorney, Agent, or Firm* — Alan Kamrath; Kamrath IP Lawfirm, P.A.

(57) ABSTRACT

A heat-dissipating fan includes a housing having a peripheral wall defining a compartment receiving a shaft seat. The peripheral wall includes a wire-guiding slot in communication with the compartment. A base is coupled to the housing and includes a coil unit and a connection port electrically connected to the coil unit. The connection port faces the wire-guiding slot. A power line includes a first end connected to the connection port and a second end extending through the wire-guiding slot. An impeller includes a hub, a shaft mounted to the hub and coupled to the shaft seat, and a permanent magnet mounted to the hub. The permanent magnet faces the coil unit. The connection port is located on a reference line passing through the shaft seat and the wire-guiding slot. A distance between the connection port and the wire-guiding slot is shortened to enhance assembling convenience of the power line.

20 Claims, 14 Drawing Sheets

(56) References Cited

FOREIGN PATENT DOCUMENTS

| | | | |
|---|---|---|---|
| JP | 2003204176 A | 7/2003 | |
| TW | 423760 U | 2/2001 | |
| TW | 443435 U | 6/2001 | |
| TW | 516663 U | 1/2003 | |

\* cited by examiner

HEAT-DISSIPATING FAN

BACKGROUND OF THE INVENTION

1. Field of the Invention

The present invention relates to a heat-dissipating fan and, more particularly, to a heat-dissipating fan allowing easy assembly of a power line.

2. Description of the Related Art

Heat-dissipating fans generally include a power line for connection with an external power source for driving the heat-dissipating fans. The position for fixing the power line must be carefully arranged to avoid the power line from being loosened or being entangled in an impeller of the heat-dissipating fan. However, the power line in most of the currently available heat-dissipating fans winds in a complex manner and, thus, causes inconvenience to assembly.

FIG. 1 shows a conventional heat-dissipating fan 70 including a wire-positioning mechanism 71. The wire-positioning mechanism 71 includes a bottom 711, two support portions 712, and two stop portions 713. A power line 72 winds through the bottom 711, the support portions 712, and the stop portions 713. Although the power line 72 can be reliably positioned by the wire-positioning mechanism 71, an end of the power line 72 must be extended from under the heat-dissipating fan 70 to the outside and then wound through the bottom 711, the support portions 712, and the stop portions 713 in sequence, increasing difficulties of assembly of the power line 72. Furthermore, the wire-positioning mechanism 71 is complex and, thus, increases the overall costs of the heat-dissipating fan 70.

FIGS. 2 and 3 show another conventional heat-dissipating fan 80 including a housing 81, a stator seat 82, an impeller 83, and a lid 84. The housing 81 includes a compartment 811 and a channel 812 in communication with the compartment 811. The stator seat 82 is mounted in the compartment 811 and has a connection port 821 connected to a power line 822. The impeller 83 is rotatably coupled to the stator seat 82 and has a permanent magnet 831. The lid 84 includes a tab 841 extending into the channel 812 when the lid 84 is coupled to the housing 81. During assembly of the power line 822, an end of the power line 822 winds through the channel 812 to the outside for connection with an external power source. The tab 841 presses against and, thus, positions the power line 822. However, the connection port 821 does not face the channel 812 and is spaced from the channel 812 by a distance. After the power line 822 is connected to the connection port 821, the power line 822 must wind through the distance in the compartment 811 before the power line 822 exits the housing 81 via the channel 812, increasing difficulties in winding the power line 822 and leading to inconvenience to assembly. Furthermore, the power line 822 is liable to be entangled into the impeller 83 during operation of the heat-dissipating fan 80, for the power line 822 winds through a considerable distance in the compartment 811 of the housing 81. Furthermore, the connection port 821 of the stator seat 82 is located below the permanent magnet 831 of the impeller 83. Thus, a spacing D must be preserved between a bottom edge of the permanent magnet 831 and the stator seat 82 for receiving the power line 822 and the connection port 821, such as a welding point, for purposes of assuring smooth rotation of the impeller 83. However, the spacing D causes a limitation to the reduction in the overall axial height of the heat-dissipating fan 80. As a result, it is difficult to achieve a light, compact design of the heat-dissipating fan 80.

FIG. 4 shows a further conventional heat-dissipating fan 90 including a base 91 having a peripheral wall. A block 92 is mounted in a wire-guiding channel 911 formed in a corner of the peripheral wall. A power line 93 of the heat-dissipating fan 90 winds through a distance in the base 91 to a position aligned with the wire-guiding channel 911 and then exits the base 91 via the wire-guiding channel 911 for connection with an external power source. The block 92 presses against and, thus, positions the power line 93. Although the wire-guiding channel 911 is formed in the corner of the base 91 to shorten the winding distance of the power line 93 in the base 91, the connection port of the stator of the heat-dissipating fan 90 for driving an impeller 94 does not face the wire-guiding channel 911. Thus, the power line 93 still has to wind through the distance in the base 91 before the power line 93 reaches the wire-guiding channel 911, increasing difficulties in winding the power line 93 and leading to inconvenience to assembly.

Thus, a need exists for a heat-dissipating fan allowing easy assembly of a power line.

SUMMARY OF THE INVENTION

An objective of the present invention is to provide a heat-dissipating fan avoiding difficulties and inconvenience in the assembly of the power line.

Another objective of the present invention is to provide a heat-dissipating fan with a reduced axial height.

In a first aspect, a heat-dissipating fan according to the preferred teachings of the present invention includes a housing having a peripheral wall defining a compartment. A shaft seat is provided in the compartment. The peripheral wall includes a wire-guiding slot in communication with the compartment. A base is coupled to the housing. The base includes a coil unit and a connection port electrically connected to the coil unit. The connection port faces the wire-guiding slot of the housing. A power line includes a first end connected to the connection port and a second end extending through the wire-guiding slot. An impeller includes a hub, a shaft mounted to the hub, and a permanent magnet mounted to the hub. The shaft is coupled to the shaft seat, and the permanent magnet faces the coil unit. The connection port is located on a reference line passing through the shaft seat and the wire-guiding slot. A distance between the connection port and the wire-guiding slot is shortened to enhance assembling convenience of the power line.

In preferred forms, the connection port of the base is located outside a rotational area of the permanent magnet, and the connection port is intermediate an outer periphery of the permanent magnet and an inner peripheral face of the peripheral wall of the housing. Thus, a spacing between the permanent magnet and the base can be shortened, since the connection port and the power line are not located in the spacing. Thus, the axial height of the heat-dissipating fan can be reduced.

In preferred forms, a positioning member is engaged in the wire-guiding slot. The wire-guiding slot includes a first pressing surface. The positioning member includes a second pressing surface. The power line is clamped between the first and second pressing surfaces, reliably positioning the power line. The first pressing surface of the wire-guiding slot includes a first stepped portion, and the second pressing surface of the positioning member includes a second stepped portion facing and engaged with the first stepped portion, preventing the power line from being pulled off the power connection port. The wire-guiding slot is located in a corner of the peripheral wall of the housing. The housing includes a bottom wall formed inside the peripheral wall and defining the compartment. A plurality of catches is formed on the bottom wall and located in the compartment. The base is mounted in the compartment and abuts the bottom wall. The catches engage with an outer periphery of the base. The coil unit is formed on a face of the base by layout to shorten an axial length of the base.

In another aspect, a heat-dissipating fan according to the preferred teachings of the present invention includes a housing having a peripheral wall defining a compartment. A shaft seat is provided in the compartment. The peripheral wall includes a wire-guiding slot in communication with the compartment. A base is coupled to the housing. The base includes a coil unit and a connection port electrically connected to the coil unit. An extension extends radially outward from an outer periphery of the base towards the wire-guiding slot. The connection port is formed on a face of the extension. A power line includes a first end connected to the connection port and a second end extending through the wire-guiding slot. An impeller includes a hub, a shaft mounted to the hub, and a permanent magnet mounted to the hub. The shaft is coupled to the shaft seat. The permanent magnet faces the coil unit. The extension and the connection port are located on a reference line passing through the shaft seat and the wire-guiding slot. By such an arrangement, the connection port is closer to the wire-guiding slot, allowing the power line to be more easily extended through the wire-guiding slot, further enhancing the assembling convenience of the power line.

In a further aspect, a heat-dissipating fan according to the preferred teachings of the present invention includes a housing having a peripheral wall defining a compartment. A shaft seat is provided in the compartment. The peripheral wall includes a wire-guiding slot in communication with the compartment. A base is coupled to the housing. The base includes a layout board and a drive circuit board electrically connected to the layout board. The layout board includes a coil unit, and the drive circuit board includes a connection port electrically connected to the coil unit. The connection port faces and is adjacent to the wire-guiding slot of the housing. A power line includes a first end connected to the connection port and a second end extending through the wire-guiding slot. An impeller includes a hub, a shaft mounted to the hub, and a permanent magnet mounted to the hub. The shaft is coupled to the shaft seat. The permanent magnet faces the coil unit. The connection port is located on a reference line passing through the shaft seat and the wire-guiding slot. By such an arrangement, the connection port is adjacent to the wire-guiding slot and away from the rotational area of the impeller, enhancing the assembling convenience of the power line, preventing the power line from being entangled into the impeller, and reducing the axial height of the heat-dissipating fan.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
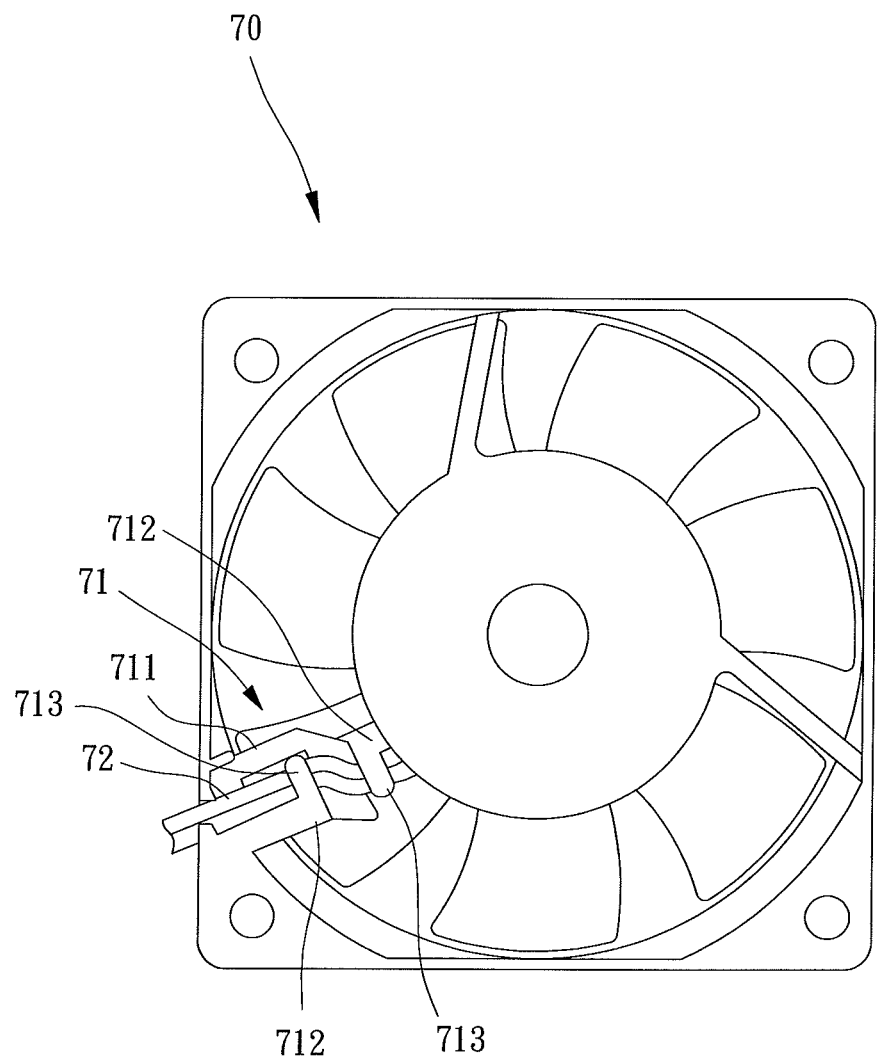
FIG. 1 shows a bottom view of a conventional heat-dissipating fan.
Figure 2:
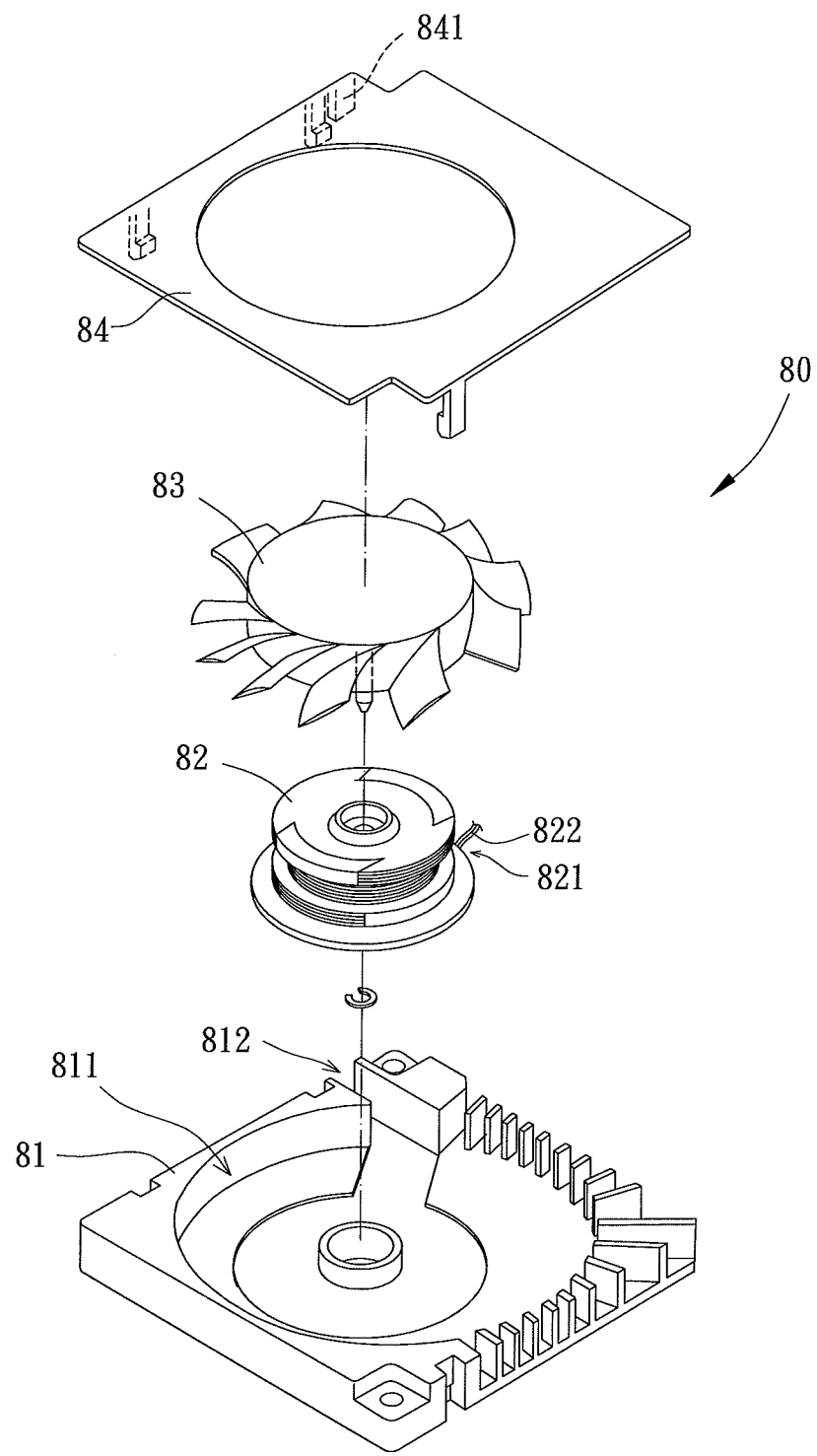
FIG. 2 shows an exploded, perspective view of another conventional heat-dissipating fan.
Figure 3:
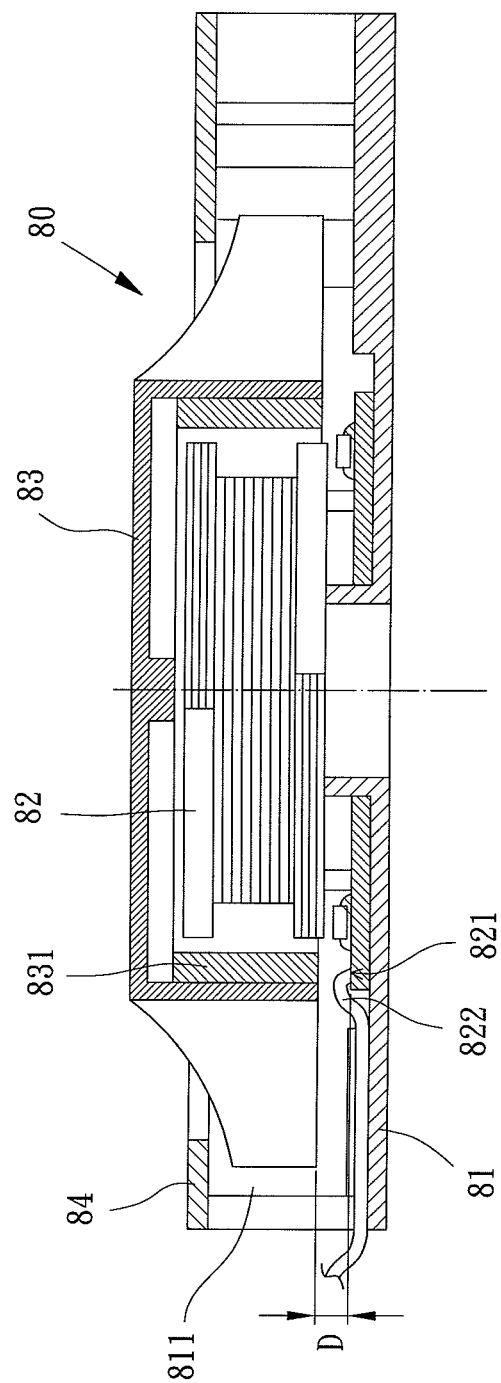
FIG. 3 shows a cross sectional view of the heat-dissipating fan of FIG. 2.
Figure 4:
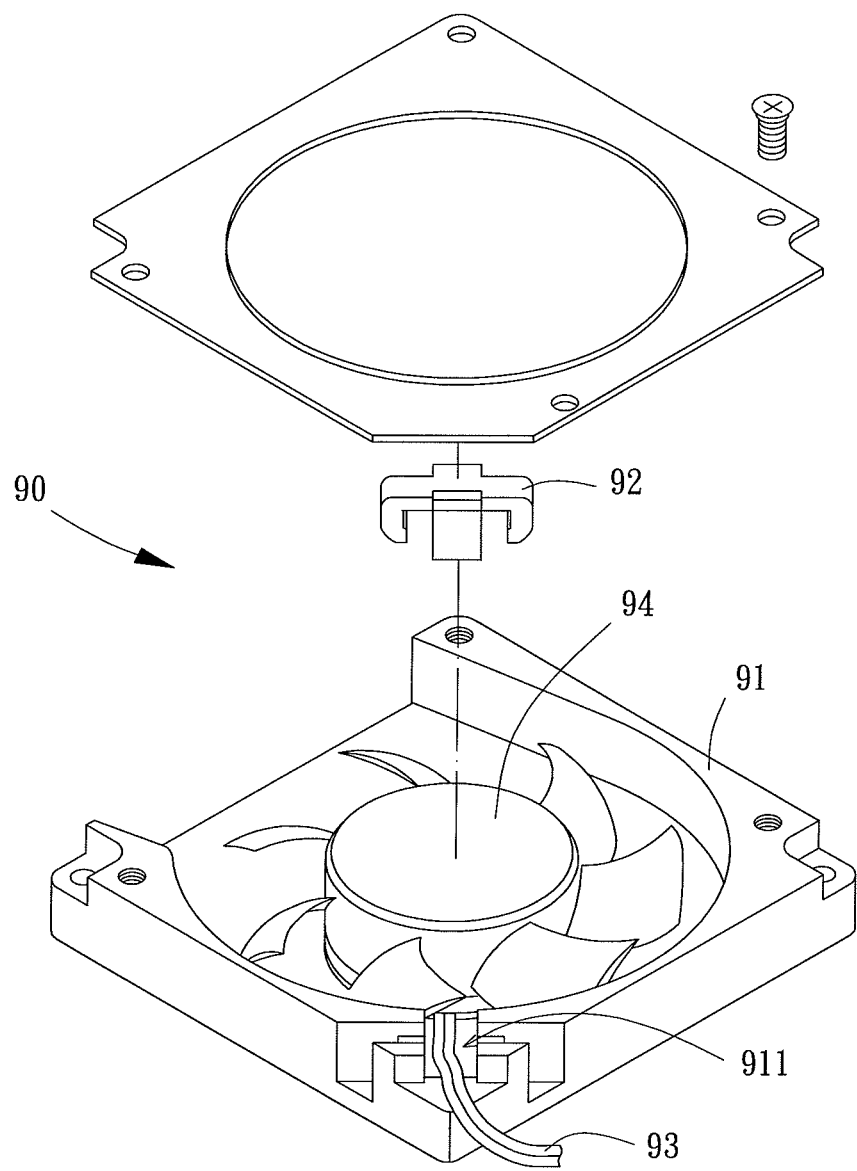
FIG. 4 shows an exploded, perspective view of a further conventional heat-dissipating fan.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "end", "radial", "axial", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 5:
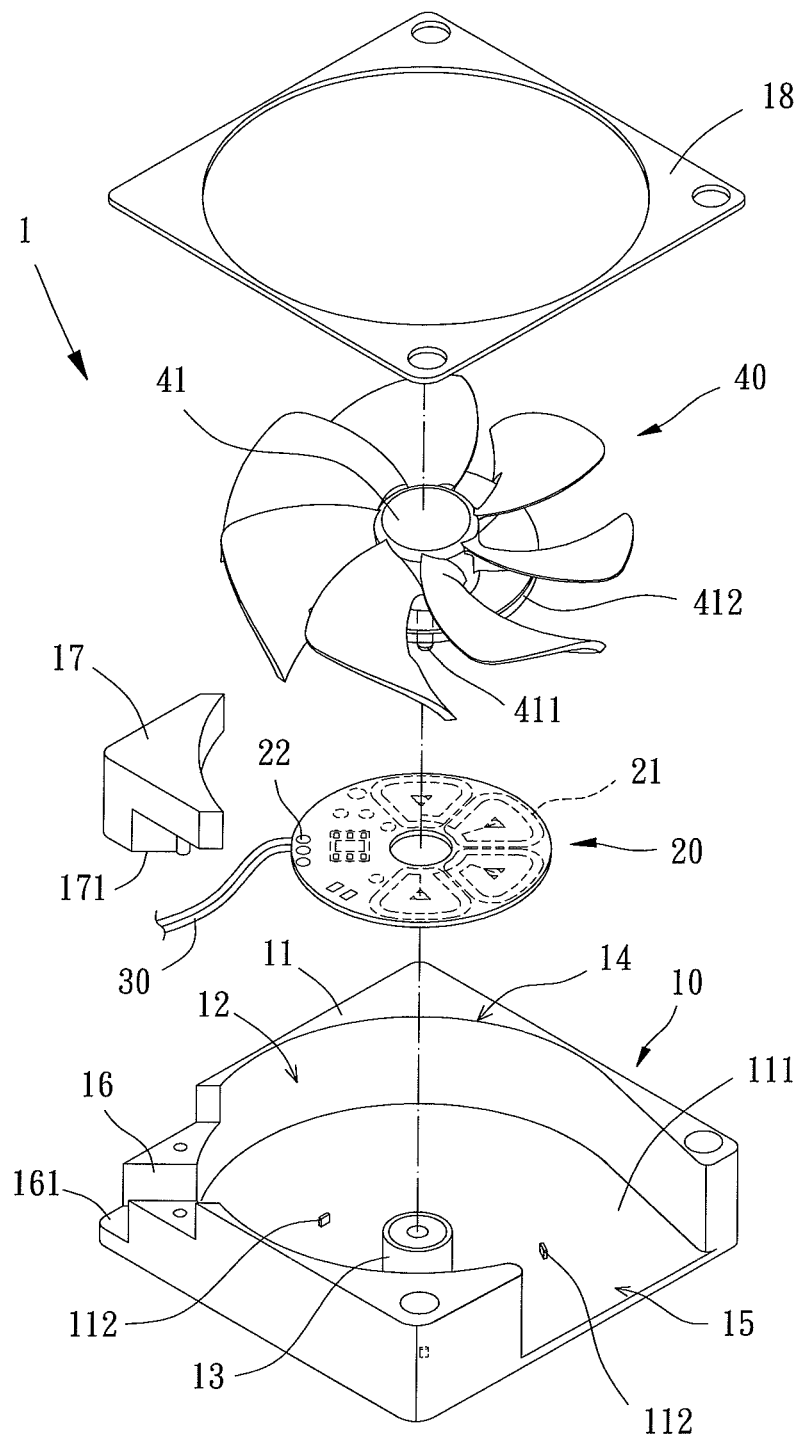
FIG. 5 shows an exploded, perspective view of a heat-dissipating fan of a first embodiment according to the preferred teachings of the present invention.
Figure 6:
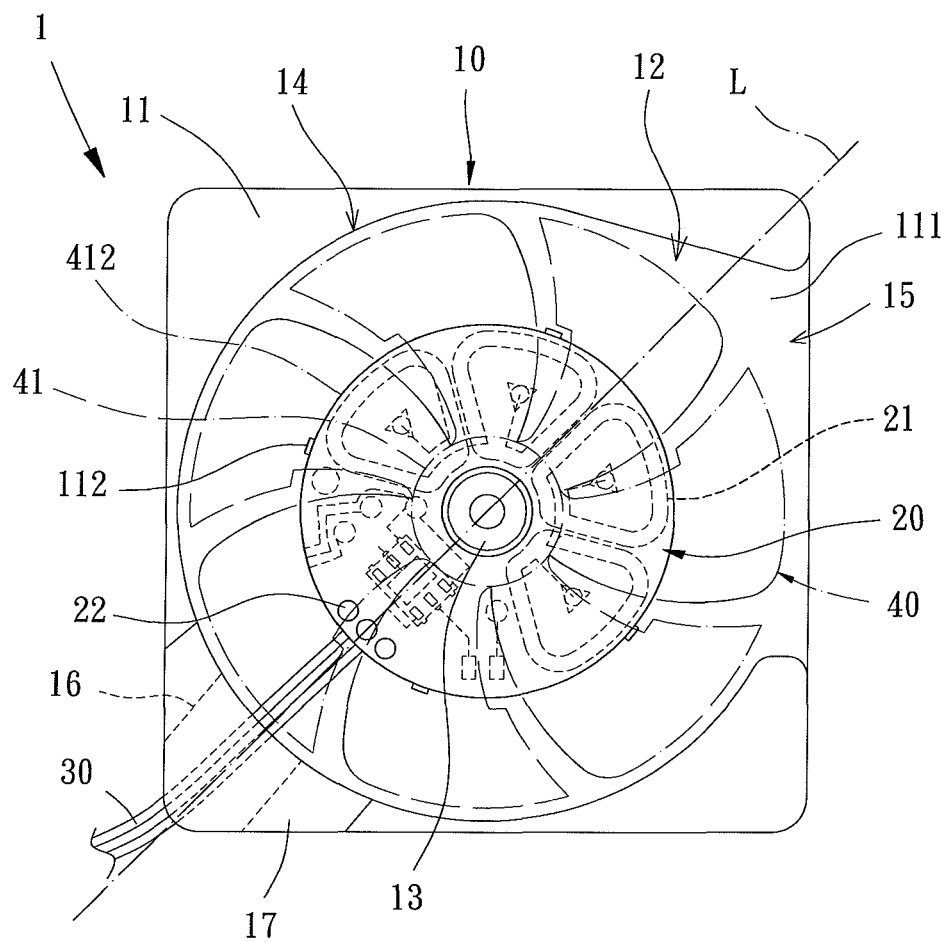
FIG. 6 shows a top view of the heat-dissipating fan of FIG. 5.

A heat-dissipating fan of a first embodiment according to the preferred teachings of the present invention is shown in FIGS. 5 and 6 and designated 1. The heating-dissipating fan 1 includes a housing 10, a base 20, a power line 30, and an impeller 40. The housing 10 includes a peripheral wall 11 defining a compartment 12. A shaft seat 13 is provided in the compartment 12. The housing 10 further includes an air inlet 14 and an air outlet 15 both in communication with the compartment 12. The housing 10 shown in FIGS. 5 and 6 is of a type for a blower fan. However, the housing 10 can be of a type for an axial flow fan. The peripheral wall 11 includes a wire-guiding slot 16 in communication with the compartment 12. Preferably, the wire-guiding slot 16 is located in a corner of the peripheral wall 11 of the housing 10. A reference line L passes through the shaft seat 13 and the wire-guiding slot 16. The housing 10 further includes a bottom wall 111 formed inside the peripheral wall 11 and defining the compartment 12. A plurality of catches 112 is formed on the bottom wall 111 and located in the compartment 12.

The base 20 is mounted in the compartment 12 and preferably coupled to the shaft seat 13. The base 20 abuts the bottom wall 111, and the catches 112 engage with an outer periphery of the base 20 to fix the base 20 in place. The base 20 includes a coil unit 21 and a connection port 22 electrically connected to the coil unit 21. Preferably, the coil unit 21 is formed on a face of the base 20 by layout or other suitable provisions to reduce an axial height of the base 20. Preferably, the connection port 22 includes one or more connections. The connection port 22 faces the wire-guiding slot 16 of the housing 10. Furthermore, the connection port 22 is located on the reference line L. Namely, the shaft seat 13, the wire-guiding slot 16, and the connection port 22 are located on the reference line L, shortening the distance between the connection port 22 and the wire-guiding slot 16.

Figure 14:
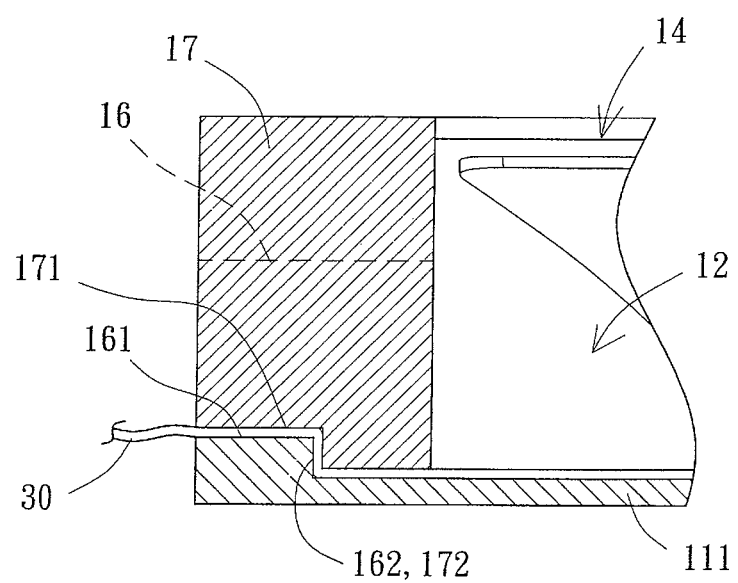
FIG. 14 shows an enlarged, partial, cross sectional view illustrating positioning of a power line by a positioning member of a heat-dissipating fan according to the preferred teachings of the present invention.

An end of the power line 30 is connected to the connection port 22 of the base 20. The other end of the power line 30 is extended beyond the housing 10 via the wire-guiding slot 16 for connection with an external power source. Thus, the power line 30 can supply electric current to the coil unit 21 of the base 20 for driving the impeller 40. A positioning member 17 is engaged in the wire-guiding slot 16. In the preferred form shown in FIGS. 5 and 6, the wire-guiding slot 16 includes a first pressing surface 161, and the positioning member 17 includes a second pressing surface 171. After the power line 30 is extended through the wire-guiding slot 16, the positioning member 17 is engaged in the wire-guiding slot 16 so that the power line 30 is clamped between the first and second pressing surfaces 161 and 171, enhancing the positioning effect for the power line 30. Thus, undesired disengagement of the end of the power line 30 from the connection port 22 is avoided. In a preferred form shown in FIG. 14, the first pressing surface 161 of the wire-guiding slot 16 includes a first stepped portion 162, and the second pressing surface 171 of the positioning member 17 includes a second stepped portion 172 engaged with the first stepped portion 162. Thus, when the power line 30 is clamped between the first and second pressing surfaces 161 and 171, the power line 30 has a bend at the first and second stepped portions 162 and 172 to provide an anti-pulling effect. Thus, disengagement of the end of the power line 30 from the connection port 22 resulting from pulling the power line 30 can be avoided. The power line 30 can be fixed in the wire-guiding slot 16 such as by glue or fasteners without using the positioning member 17.

The impeller 40 includes a hub 41. A shaft 411 and a permanent magnet 412 are mounted to the hub 41. The shaft 411 is coupled to the shaft seat 13, so that the impeller 40 is rotatable in the compartment 12 of the housing 10 about an axis. The permanent magnet 412 is aligned with the coil unit 21.

In use, the coil unit 21 interacts with the permanent magnet 412 to drive the impeller 40 to rotate. Air currents are driven by the impeller 40 into the compartment 12 via the air inlet 14 and then exit the housing 10 via the air outlet 15 to proceed with heat dissipation. Thus, the heat-dissipating fan 1 according to the preferred teachings of the present invention can be mounted in differing electronic devices or equipment and provide desired heat-dissipating effect.

Since the connection port 22 faces the wire-guiding slot 16 of the housing 10 and since the connection port 22 is located on the reference line L, the connection port 22 is close to the wire-guiding slot 16. Namely, the distance between the connection port 22 and the wire-guiding slot 16 can be shortened. After the end of the power line 30 is connected to the connection port 22, the other end of the power line 30 can extend beyond the housing 10 directly through the wire-guiding slot 16 without the need of winding the power line 30 inside the housing 10. Thus, the power line 30 can be straight extended through the wire-guiding slot 16, enhancing assembling convenience and reliably preventing the power line 30 from being entangled into the impeller 40 during operation of the heat-dissipating fan 1 according to the preferred teachings of the present invention.

Figure 7:
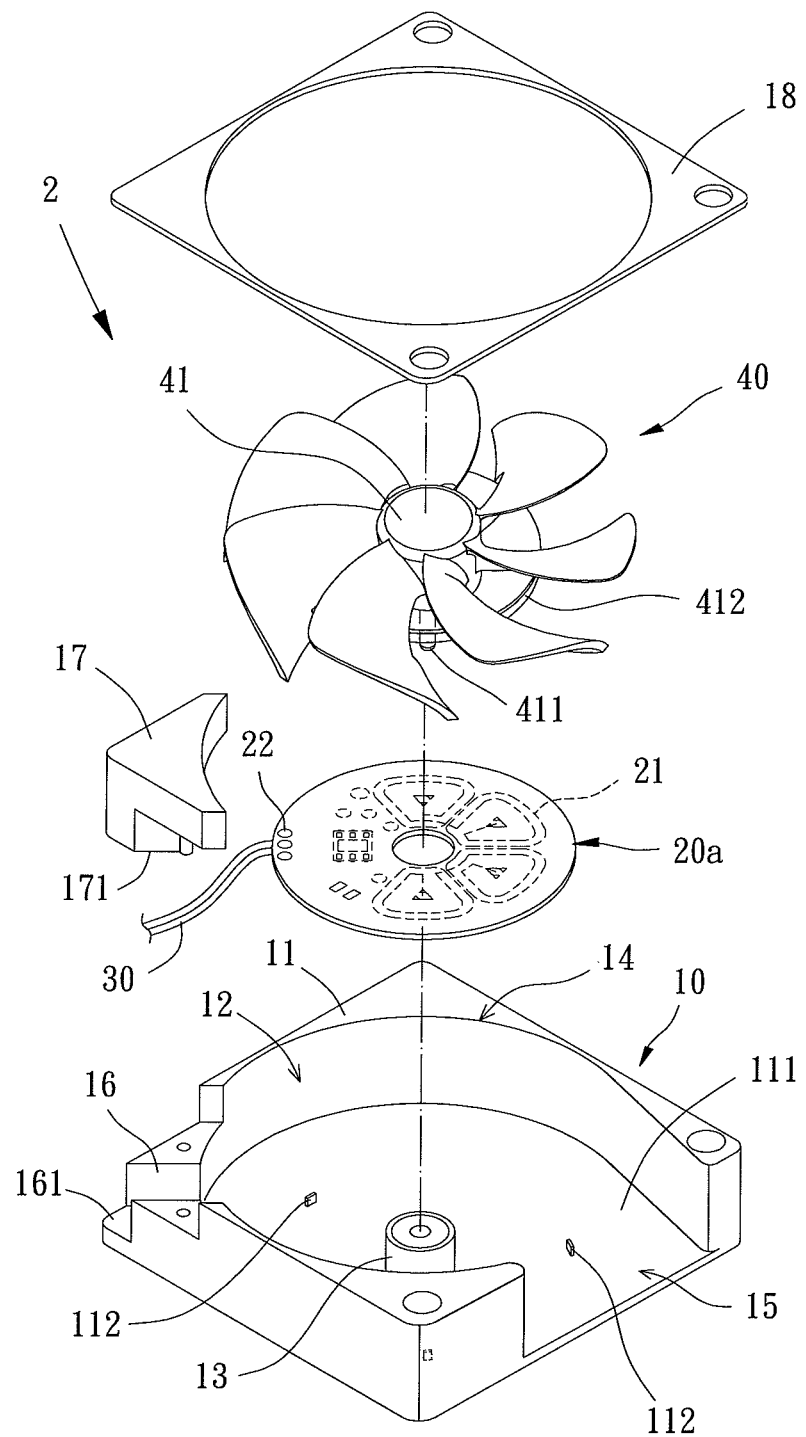
FIG. 7 shows an exploded, perspective view of a heat-dissipating fan of a second embodiment according to the preferred teachings of the present invention.
Figure 8:
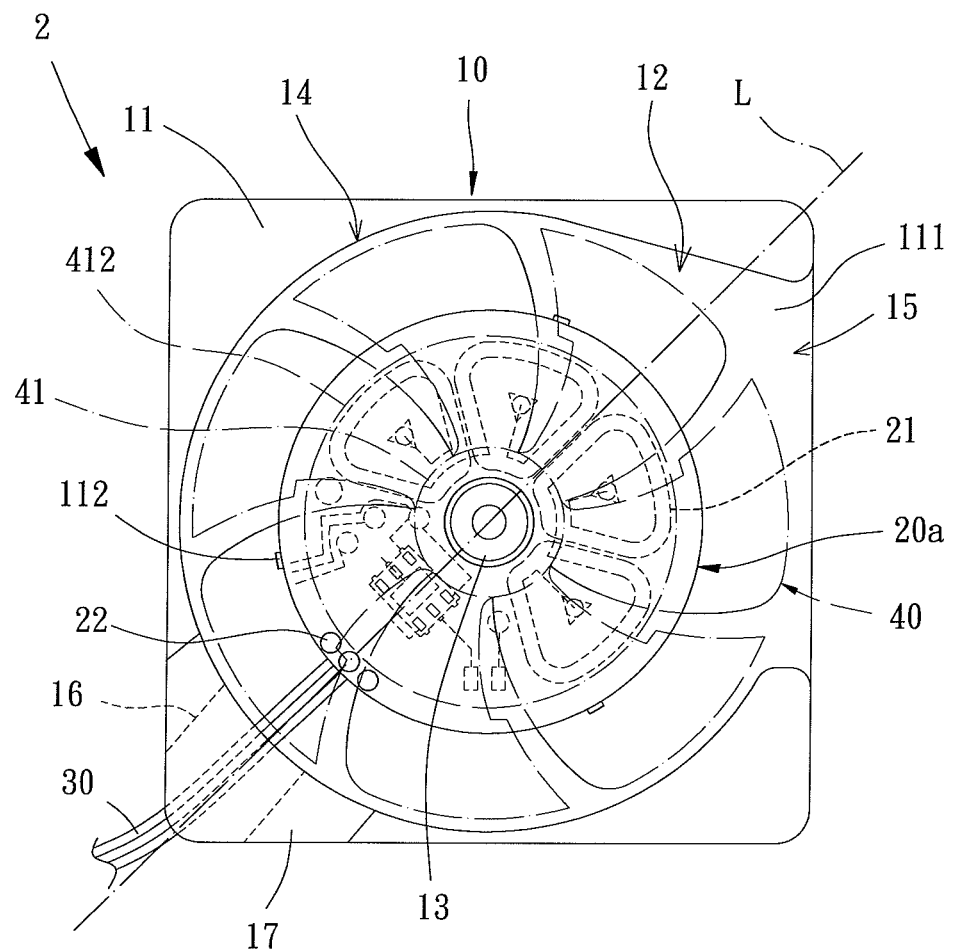
FIG. 8 shows a top view of the heat-dissipating fan of FIG. 7.
Figure 9:
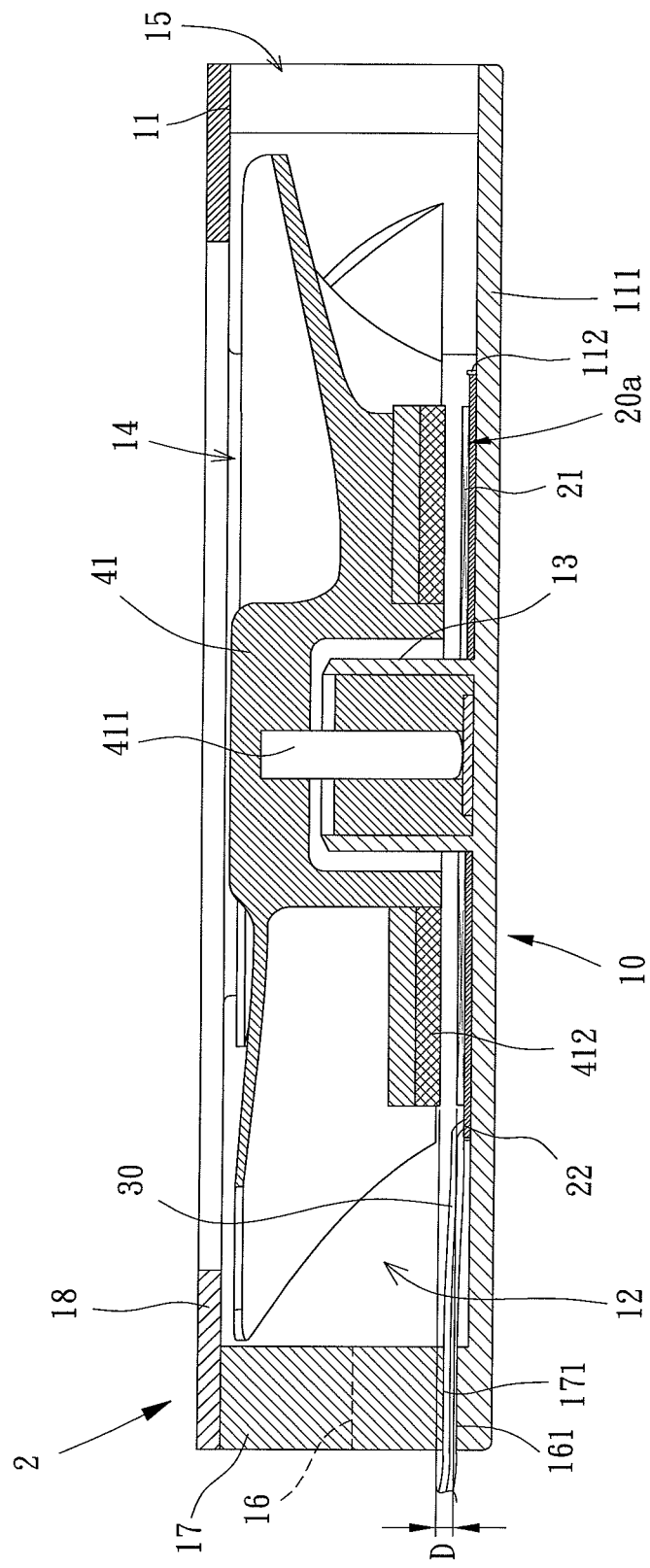
FIG. 9 shows a cross sectional view of the heat-dissipating fan of FIG. 7.

FIGS. 7-9 show a heat-dissipating fan 2 of a second embodiment according to the preferred teachings of the present invention. The heat-dissipating fan 2 includes a housing 10, a base 20a, a power line 30, and an impeller 40. The housing 10, the power line 30, and the impeller 40 of the second embodiment are substantially the same as those of the first embodiment and, thus, not described in detail to avoid redundancy.

The base 20a includes a coil unit 21 and a connection port 22 electrically connected to the coil unit 21. The connection port 22 is located outside of a rotational area of the permanent magnet 412. Specifically, the connection port 22 is intermediate an outer periphery of the permanent magnet 412 and an inner peripheral face of the peripheral wall 11 of the housing 10.

Since the connection port 22 faces the wire-guiding slot 16 of the housing 10 and since the connection port 22 is located on the reference line L, the assembling convenience of the power line 30 is enhanced. Furthermore, the power line 30 is prevented from being entangled into the impeller 40 during operation of the heat-dissipating fan 2. Furthermore, a spacing D (FIG. 9) between the permanent magnet 412 of the impeller 40 and the base 20a can be shortened, since the connection port 22 and the power line 30 are not located in the spacing D. Thus, the overall axial height of the heat-dissipating fan 2 along the axis can be reduced, allowing a light, compact design of the heat-dissipating fan 2.

Figure 10:
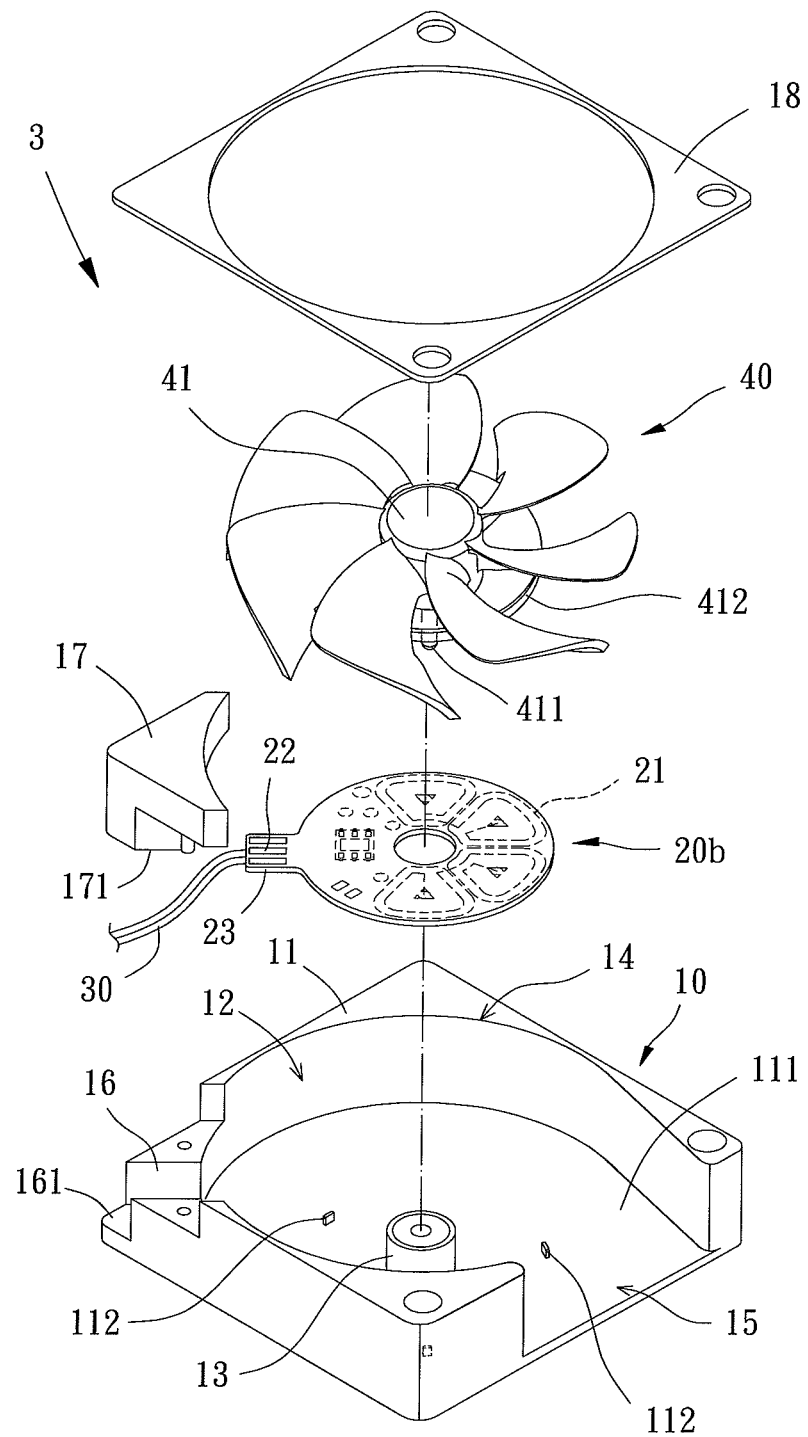
FIG. 10 shows an exploded, perspective view of a heat-dissipating fan of a third embodiment according to the preferred teachings of the present invention.
Figure 11:
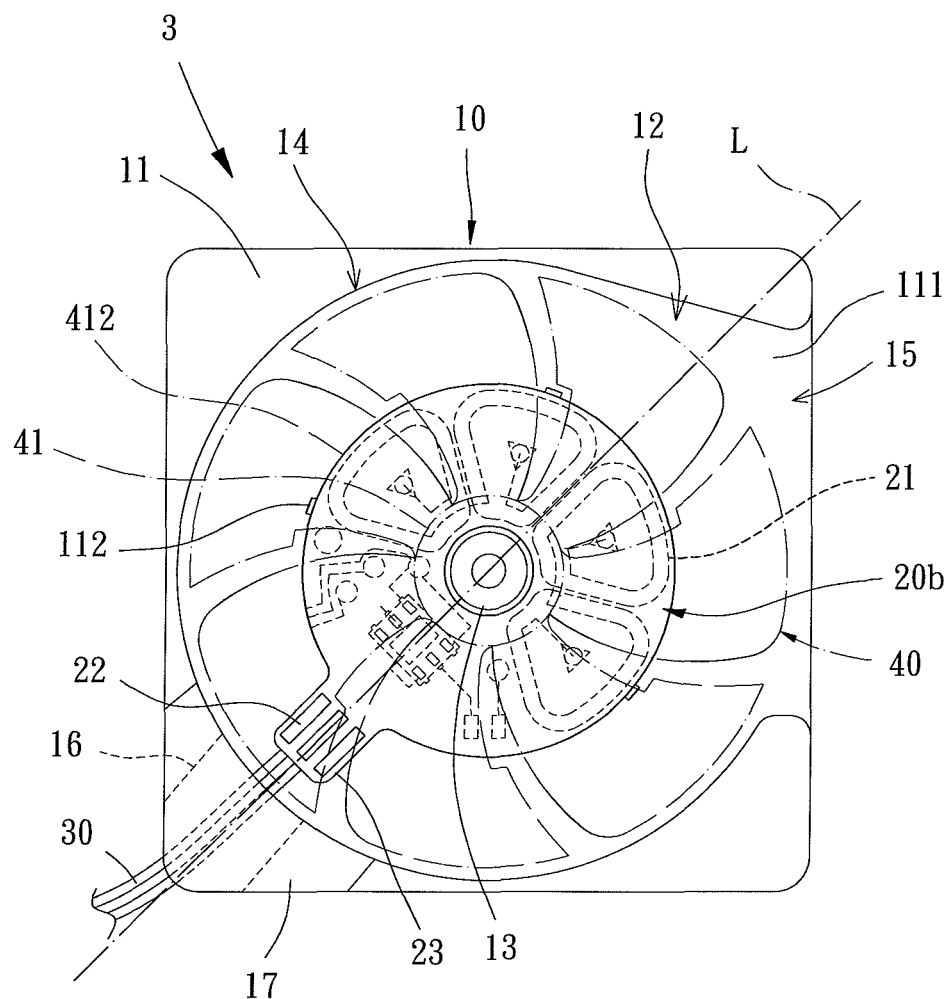
FIG. 11 shows a top view of the heat-dissipating fan of FIG. 10.

FIGS. 10 and 11 show a heat-dissipating fan 3 of a third embodiment according to the preferred teachings of the present invention. The heat-dissipating fan 3 includes a housing 10, a base 20b, a power line 30, and an impeller 40. The housing 10, the power line 30, and the impeller 40 of the third embodiment are substantially the same as those of the first embodiment and, thus, not described in detail to avoid redundancy.

The base 20b includes a coil unit 21 and a connection port 22 electrically connected to the coil unit 21. Specifically, an extension 23 extends radially outward from an outer periphery of the base 20 towards the wire-guiding slot 16. The connection port 22 is formed on a face of the extension 23. The extension 23 and the connection port 22 are located on the reference line L.

Since the connection port 22 faces the wire-guiding slot 16 of the housing 10 and since the connection port 22 is located on the reference line L, the assembling convenience of the power line 30 is enhanced. Furthermore, the power line 30 is prevented from being entangled into the impeller 40 during operation of the heat-dissipating fan 3. Furthermore, by providing the extension 23 of the base 20b, the connection port 22 is located outside of the rotational area of the permanent magnet 412 of the impeller 40. Further, the connection port 22 is closer to the wire-guiding slot 16, so that straight insertion of the other end of the power line 30 through the wire-guiding slot 16 is easier, further enhancing the assembling convenience of the power line 30.

Figure 12:
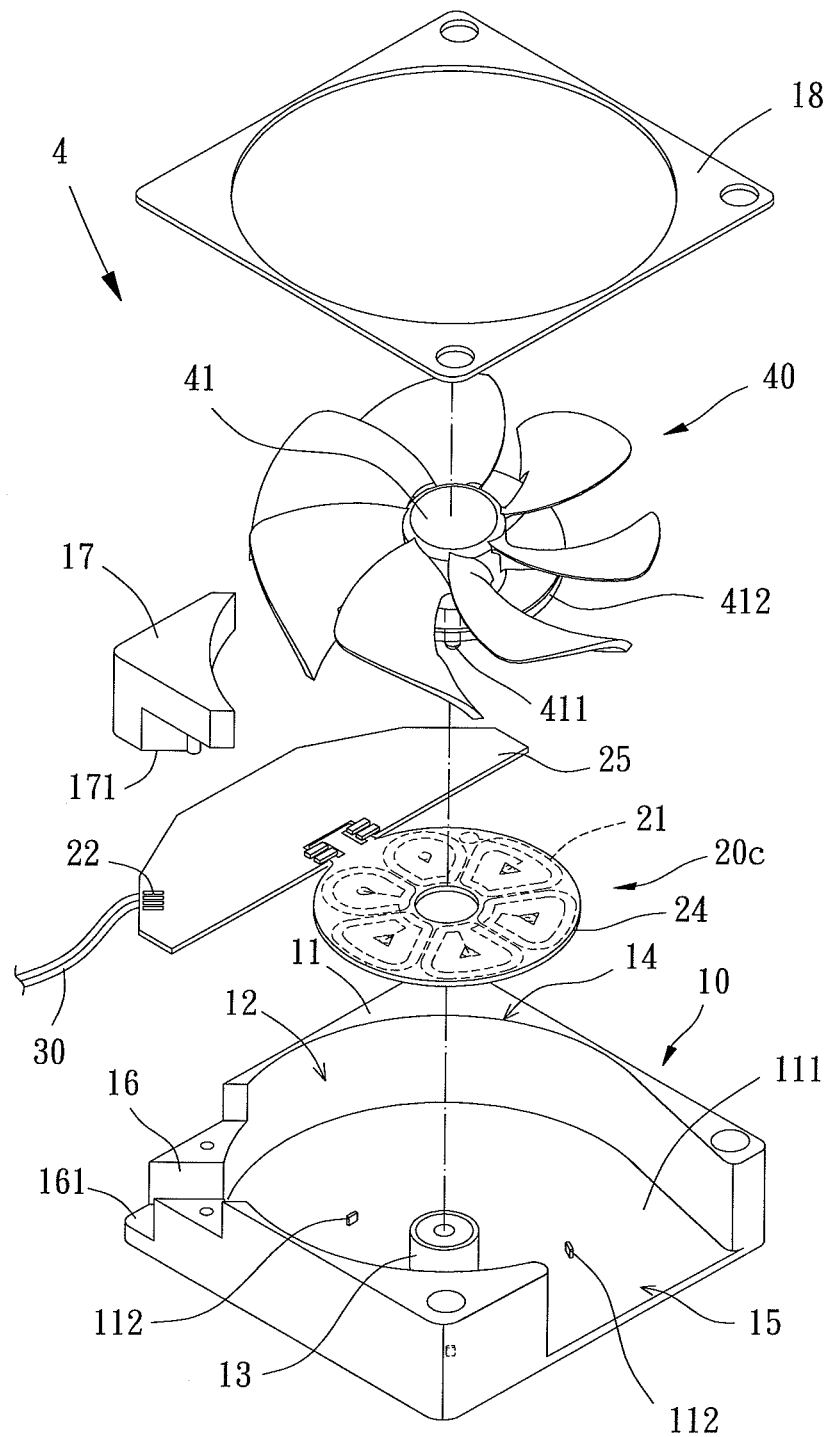
FIG. 12 shows an exploded, perspective view of a heat-dissipating fan of a fourth embodiment according to the preferred teachings of the present invention.
Figure 13:
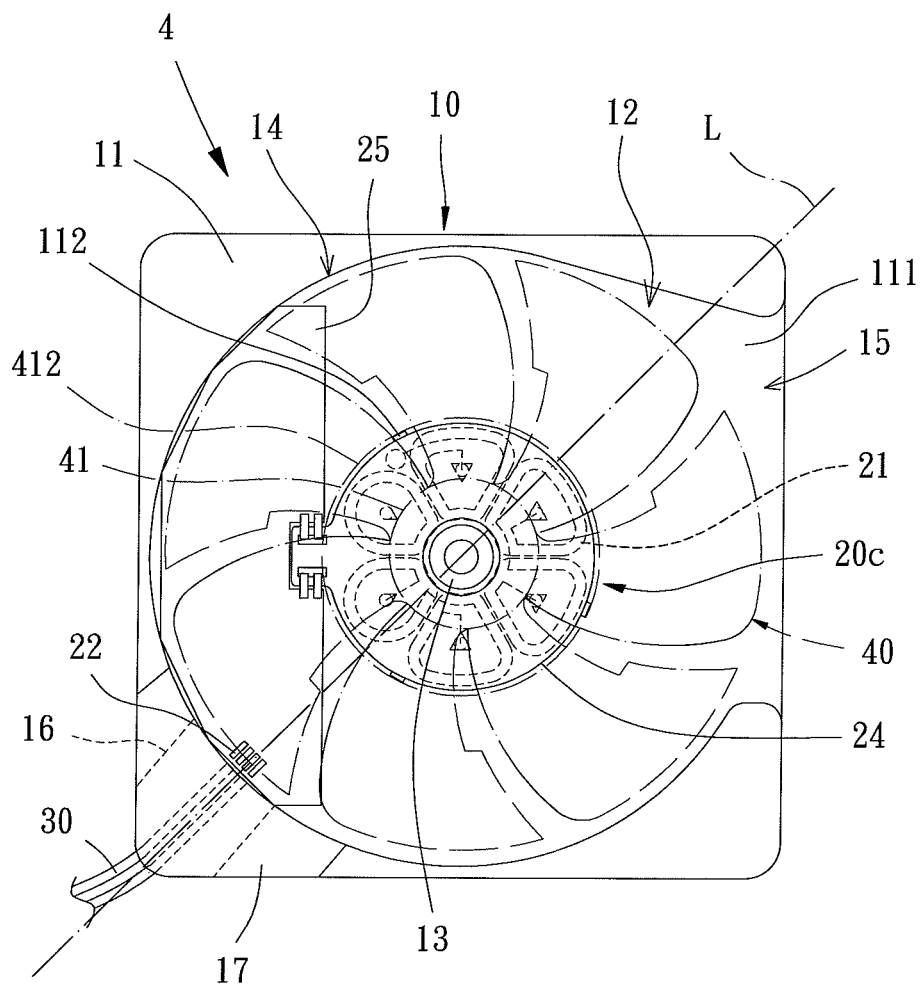
FIG. 13 shows a top view of the heat-dissipating fan of FIG. 12.

FIGS. 12 and 13 show a heat-dissipating fan 4 of a fourth embodiment according to the preferred teachings of the present invention. The heat-dissipating fan 4 includes a housing 10, a base 20c, a power line 30, and an impeller 40. The housing 10, the power line 30, and the impeller 40 of the fourth embodiment are substantially the same as those of the first embodiment and, thus, not described in detail to avoid redundancy.

The base 20c includes a coil unit 21 and a connection port 22 electrically connected to the coil unit 21. Specifically, the base 20c includes a layout board 24 and a drive circuit board 25 electrically connected to the layout board 24. The connection port 22 is formed on a face of the drive circuit board 25. The connection port 22 is located on the reference line L. Furthermore, the connection port 22 is adjacent to and faces the wire-guiding slot 16. The drive circuit board 25 can include a drive circuit consisting of a plurality of electric elements. The drive circuit board 25 can activate the coil unit 21 to drive the impeller 40 to rotate.

Since the connection port 22 faces the wire-guiding slot 16 of the housing 10 and since the connection port 22 is located on the reference line L, the assembling convenience of the power line 30 is enhanced. Furthermore, the connection port 22 is adjacent to the wire-guiding slot 16 due to provision of the drive circuit board 25, further enhancing the assembling convenience of the power line 30. Furthermore, the electric elements on the drive circuit board 25 are located outside of the rotational area of the permanent magnet 412 of the impeller 40, so that the power line 30 is far away from the rotational area of the impeller 40. Further, the connection port 22 is closer to the wire-guiding slot 16, so that straight insertion of the other end of the power line 30 through the wire-guiding slot 16 is easier, further enhancing the assembling convenience of the power line 30. The overall axial height of the heat-dissipating fan 4 along the axis can be reduced while preventing the power line 30 from being entangled into the impeller 40 during operation of the heat-dissipating fan 4.

In the preferred forms shown in FIGS. 5-14, a lid 18 having an air-guiding opening is mounted to the housing 10 for smoothly guiding air currents into the compartment 12 of the housing 10.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A heat-dissipating fan, in combination:
   a housing including a peripheral wall defining a compartment, with a shaft seat provided in the compartment, with the peripheral wall including a wire-guiding slot in communication with the compartment;
   a base coupled to the housing, with the base including a coil unit and a connection port electrically connected to the coil unit, with the connection port facing the wire-guiding slot of the housing;
   a power line including a first end connected to the connection port and a second end extending through the wire-guiding slot; and
   an impeller including a hub, a shaft mounted to the hub, and a permanent magnet mounted to the hub, with the shaft rotatably coupled to the shaft seat about a rotation axis, with the permanent magnet facing the coil unit,
   with the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot,
   with the housing including a bottom wall formed inside the peripheral wall and defining the compartment, with a plurality of catches being formed on the bottom wall and located in the compartment, with the base mounted in the compartment and abutting the bottom wall, and with the plurality of catches engaged with an outer periphery of the base.

2. The heat-dissipating fan as claimed in claim 1, with the connection port of the base located outside of a rotational area of the permanent magnet, and with the connection port intermediate an outer periphery of the permanent magnet and an inner peripheral face of the peripheral wall of the housing.

3. The heat-dissipating fan as claimed in claim 1, further comprising, in combination: a positioning member engaged in the wire-guiding slot, with the wire-guiding slot including a first pressing surface, with the positioning member including a second pressing surface, and with the power line clamped between the first and second pressing surfaces.

4. The heat-dissipating fan as claimed in claim 3, with the first pressing surface of the wire-guiding slot including a first stepped portion, with the second pressing surface of the positioning member including a second stepped portion facing and engaged with the first stepped portion.

5. The heat-dissipating fan as claimed in claim 4, with the wire-guiding slot located in a corner of the peripheral wall of the housing.

6. The heat-dissipating fan as claimed in claim 1, with the wire-guiding slot located in a corner of the peripheral wall of the housing.

7. The heat-dissipating fan as claimed in claim 1, with the coil unit formed on a face of the base by layout.

8. A heat-dissipating fan, in combination:
   a housing including a peripheral wall defining a compartment, with a shaft seat provided in the compartment, with the peripheral wall including a wire-guiding slot in communication with the compartment;
   a base coupled to the housing, with the base including a coil unit and a connection port electrically connected to the coil unit, with the base including an outer periphery, with the base further including an extension extending radially outward from the outer periphery of the base towards the wire-guiding slot, with the connection port formed on a face of the extension;
   a power line including a first end connected to the connection port and a second end extending through the wire-guiding slot; and
   an impeller including a hub, a shaft mounted to the hub, and a permanent magnet mounted to the hub, with the shaft rotatably coupled to the shaft seat about a rotation axis, with the permanent magnet facing the coil unit,
   with the extension and the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot,
   with the housing including a bottom wall formed inside the peripheral wall and defining the compartment, with a plurality of catches formed on the bottom wall and located in the compartment, with the base mounted in the compartment and abutting the bottom wall, and with the plurality of catches engaged with an outer periphery of the base.

9. The heat-dissipating fan as claimed in claim 8, with the connection port of the base located outside of a rotational area of the permanent magnet, and with the connection port intermediate an outer periphery of the permanent magnet and an inner peripheral face of the peripheral wall of the housing.

10. The heat-dissipating fan as claimed in claim 8, further comprising, in combination: a positioning member engaged in the wire-guiding slot, with the wire-guiding slot including a first pressing surface, with the positioning member including a second pressing surface, and with the power line clamped between the first and second pressing surfaces.

11. The heat-dissipating fan as claimed in claim 10, with the first pressing surface of the wire-guiding slot including a first stepped portion, with the second pressing surface of the positioning member including a second stepped portion facing and engaged with the first stepped portion.

12. The heat-dissipating fan as claimed in claim 11, with the wire-guiding slot located in a corner of the peripheral wall of the housing.

13. The heat-dissipating fan as claimed in claim 8, with the wire-guiding slot located in a corner of the peripheral wall of the housing.

14. A heat-dissipating fan, in combination:
a housing including a peripheral wall defining a compartment, with a shaft seat provided in the compartment, with the peripheral wall including a wire-guiding slot in communication with the compartment, with the peripheral wall having an inner periphery;
a base coupled to the housing, with the base including a layout board and a drive circuit board electrically connected to the layout board, with the layout board including a coil unit, with the drive circuit board including a connection port electrically connected to the coil unit, with the connection port facing and adjacent to the wire-guiding slot of the housing, with the drive circuit board having an edge abutting against the inner periphery of the peripheral wall, with the connection port positioned in a position of the drive circuit board adjacent to the edge of the drive circuit board;
a power line including a first end connected to the connection port and a second end extending through the wire-guiding slot; and
an impeller including a hub, a shaft mounted to the hub, and a permanent magnet mounted to the hub, with the shaft rotatably coupled to the shaft seat about a rotation axis, with the permanent magnet facing the coil unit,
with the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot,
with the housing including a bottom wall formed inside the peripheral wall and defining the compartment, with a plurality of catches being formed on the bottom wall and located in the compartment, with the base mounted in the compartment and abutting the bottom wall, and with the plurality of catches engaged with an outer periphery of the base.

15. The heat-dissipating fan as claimed in claim 14, further comprising, in combination: a positioning member engaged in the wire-guiding slot, with the wire-guiding slot including a first pressing surface, with the positioning member including a second pressing surface, and with the power line clamped between the first and second pressing surfaces.

16. The heat-dissipating fan as claimed in claim 15, with the first pressing surface of the wire-guiding slot including a first stepped portion, with the second pressing surface of the positioning member including a second stepped portion facing and engaged with the first stepped portion.

17. The heat-dissipating fan as claimed in claim 14, with the wire-guiding slot located in a corner of the peripheral wall of the housing.

18. A heat-dissipating fan, in combination:
a housing including a peripheral wall defining a compartment, with a shaft seat provided in the compartment, with the peripheral wall including a wire-guiding slot in communication with the compartment;
a base coupled to the housing, with the base including a coil unit and a connection port electrically connected to the coil unit, with the connection port facing the wire-guiding slot of the housing;
a power line including a first end connected to the connection port and a second end extending through the wire-guiding slot; and
an impeller including a hub, a shaft mounted to the hub, and a permanent magnet mounted to the hub, with the shaft rotatably coupled to the shaft seat about a rotation axis, with the permanent magnet facing the coil unit,
with the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot,
with the housing having a first side and a second side spaced from the first side along the rotation axis, with the peripheral wall extending from the first side to the second side along the rotation axis, with the peripheral wall having an inner periphery and an outer periphery, with the inner periphery extending from the first side to the second side to define the compartment, with the outer periphery having quadrilateral cross sections including four faces, with the housing having a radial thickness between the inner and outer peripheries of the peripheral wall, with said radial thickness being greatest at positions where adjacent faces connect to each other, with the wire-guiding slot extending from the inner periphery to the outer periphery at one of the positions where adjacent faces connect to each other, with the wire-guiding slot extending through the housing from the second side towards the first side, and with the wire-guiding slot spaced from the first side.

19. A heat-dissipating fan, in combination:
a housing including a peripheral wall defining a compartment, with a shaft seat provided in the compartment, with the peripheral wall including a wire-guiding slot in communication with the compartment;
a base coupled to the housing, with the base including a coil unit and a connection port electrically connected to the coil unit, with the base including an outer periphery, with the base further including an extension extending radially outward from the outer periphery of the base towards the wire-guiding slot, with the connection port formed on a face of the extension;
a power line including a first end connected to the connection port and a second end extending through the wire-guiding slot; and
an impeller including a hub, a shaft mounted to the hub, and a permanent magnet mounted to the hub, with the shaft rotatably coupled to the shaft seat about a rotation axis, with the permanent magnet facing the coil unit,
with the extension and the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot, with the housing having a first side and a second side spaced from the first side along the rotation axis, with the peripheral wall extending from the first side to the second side along the rotation axis, with the peripheral wall having an inner periphery and an outer periphery, with the inner periphery extending from the first side to the second side to define the compartment, with the outer periphery having quadrilateral cross sections including four faces, with the housing having a radial thickness between the inner and outer peripheries of the peripheral wall, with said radial thickness being greatest at positions where adjacent faces connect to each other, with the wire-guiding slot extending from the inner periphery to the outer periphery at one of the positions where adjacent faces connect to each other, with the wire-guiding slot extending through the housing from the second side towards the first side, and with the wire-guiding slot spaced from the first side.

20. A heat-dissipating fan, in combination:

a housing including a peripheral wall defining a compartment, with a shaft seat provided in the compartment, with the peripheral wall including a wire-guiding slot in communication with the compartment, with the peripheral wall having an inner periphery;

a base coupled to the housing, with the base including a layout board and a drive circuit board electrically connected to the layout board, with the layout board including a coil unit, with the drive circuit board including a connection port electrically connected to the coil unit, with the connection port facing and adjacent to the wire-guiding slot of the housing, with the drive circuit board having an edge abutting against the inner periphery of the peripheral wall, with the connection port positioned in a position of the drive circuit board adjacent to the edge of the drive circuit board;

a power line including a first end connected to the connection port and a second end extending through the wire-guiding slot; and an impeller including a hub, a shaft mounted to the hub, and a permanent magnet mounted to the hub, with the shaft rotatably coupled to the shaft seat about a rotation axis, with the permanent magnet facing the coil unit, with the connection port located on a reference line radially extending from the rotation axis and passing through the shaft seat and the wire-guiding slot, with the power line extending from the shaft seat to the wire-guiding slot along the reference line, and with the power line further extending beyond the housing through the wire-guiding slot, with the housing having a first side and a second side spaced from the first side along the rotation axis, with the peripheral wall extending from the first side to the second side along the rotation axis, with the peripheral wall having an outer periphery, with the inner periphery extending from the first side to the second side to define the compartment, with the outer periphery having quadrilateral cross sections including four faces, with the housing having a radial thickness between the inner and outer peripheries of the peripheral wall, with said radial thickness being greatest at positions where adjacent faces connect to each other, with the wire-guiding slot extending from the inner periphery to the outer periphery at one of the positions where adjacent faces connect to each other, with the wire-guiding slot extending through the housing from the second side towards the first side, and with the wire-guiding slot spaced from the first side.

\* \* \* \* \*